(12) United States Patent
Takagi et al.

(10) Patent No.: US 8,562,370 B2
(45) Date of Patent: Oct. 22, 2013

(54) ELECTRICAL CONNECTOR, ELECTRICAL CONNECTOR UNIT, AND ELECTRIC VEHICLE CHARGER

(75) Inventors: Yohei Takagi, Tokyo (JP); Yoshiro Otsuka, Tokyo (JP); Osamu Hashiguchi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 0 days.

(21) Appl. No.: 13/252,485

(22) Filed: Oct. 4, 2011

(65) Prior Publication Data

US 2012/0108097 A1 May 3, 2012

(30) Foreign Application Priority Data

Oct. 29, 2010 (JP) ................................. 2010-243969

(51) Int. Cl.
*H01R 4/50* (2006.01)

(52) U.S. Cl.
USPC .......................................................... 439/345

(58) Field of Classification Search
USPC ......... 439/345, 352–357, 310, 138, 376, 372, 439/142
See application file for complete search history.

(56) References Cited

U.S. PATENT DOCUMENTS

| 5,344,330 | A | * | 9/1994 | Hoffman ........................ 439/138 |
| 5,344,331 | A | * | 9/1994 | Hoffman et al. .............. 439/138 |
| 5,385,480 | A | * | 1/1995 | Hoffman ........................ 439/310 |
| 5,478,250 | A | * | 12/1995 | Hoffman ........................ 439/142 |
| 5,674,086 | A | * | 10/1997 | Hashizawa et al. ........... 439/310 |
| 5,676,560 | A | * | 10/1997 | Endo et al. .................... 439/310 |
| 5,751,135 | A |   | 5/1998 | Fukushima et al. |
| 5,816,643 | A | * | 10/1998 | Itou et al. ................... 296/97.22 |
| 5,906,500 | A | * | 5/1999 | Kakuta et al. ................. 439/310 |
| 6,511,341 | B1 | * | 1/2003 | Finona et al. ................. 439/475 |
| 8,016,604 | B2 |   | 9/2011 | Matsumoto et al. |

FOREIGN PATENT DOCUMENTS

JP 9-161898 6/1997
JP 2010-123521 6/2010

* cited by examiner

*Primary Examiner* — Jean F Duverne
(74) *Attorney, Agent, or Firm* — Collard & Roe, P.C.

(57) ABSTRACT

A power feeding side connector (electrical connector) has a locking lever adapted to lock together the power feeding side connector and a power receiving side connector at the time of engagement therebetween, a microswitch adapted to detect halfway fitting of the locking lever to interrupt electrical conduction, and a release lever adapted to release locking by the locking lever after charging. In the halfway fitting state, an intermediate portion of the locking lever is brought into contact with a spring piece of the microswitch to push it so that normally-closed contacts of the microswitch are opened to interrupt electrical conduction.

10 Claims, 7 Drawing Sheets

ELECTRICAL CONNECTOR, ELECTRICAL CONNECTOR UNIT, AND ELECTRIC VEHICLE CHARGER

This application is based upon and claims the benefit of priority from Japanese patent application No. 2010-243969, filed on Oct. 29, 2010, the disclosure of which is incorporated herein in its entirety by reference.

BACKGROUND OF THE INVENTION

This invention relates to an electrical connector, an electrical connector unit, and an electric vehicle charger using the electrical connector.

In a fitting structure between a plug connector and a receptacle connector of an electrical connector unit, there may be provided locking portions that serve to prevent disengagement between the connectors when the connectors have reached a predetermined fitting position.

This structure may be provided with a structure that prevents electrical conduction between the connectors in an incomplete or halfway fitting state where the locking portions are not completely locked together.

This is because, for example, in an electrical connector unit for electric vehicle charging that relays the power of high voltage and current, if electrical conduction, i.e. charging, is accidentally started in the halfway fitting state, a leak or the like may occur, which is very dangerous.

As the structure that prevents electrical conduction between the connectors in the halfway fitting state, there is a structure described in JP-A-H09-161898 (Patent Document 1) or JP-A-2010-123521 (Patent Document 2).

Specifically, in this structure, a plug connector comprises a microswitch and a seesaw-type locking lever, wherein the locking lever has a locking portion for fitting at one end, a pushing portion, at the other end, adapted to be brought into contact with the microswitch, and a rotation shaft between the locking portion and the pushing portion.

In the case of the above-mentioned structure, in the halfway fitting state, the locking portion rides on a front slope of a locking projection of a mating connector (receptacle connector) and, therefore, the locking lever is rotated in a direction of pushing the microswitch so that the pushing portion pushes a spring piece of the microswitch, thereby interrupting electrical conduction.

SUMMARY OF THE INVENTION

In the structure of Patent Document 1 or 2, however, there is a structural restriction that the locking portion and the pushing portion should be respectively provided on both sides of the locking lever with respect to the rotation shaft and there is a further structural restriction that the microswitch should be provided on the pushing portion side of the locking lever.

As a consequence, there has been a problem that the degree of freedom of design is low and thus it is difficult to achieve a reduction in size and cost of an electrical connector.

Further, in the structure of Patent Document 1 or 2, since the locking portion and the pushing portion are integral with each other, if the pushing portion is subjected to size abnormality or deformation due to falling or dropping in the manufacture or use of the connector, halfway fitting cannot be detected even if there is no problem in size or shape on the locking portion side.

Therefore, there has been a problem that the halfway fitting detection accuracy is easily affected by the manufacturing or use conditions and thus it is difficult to maintain the detection accuracy at high level.

This invention has been made in view of the above-mentioned problems and has an object to provide an electrical connector with which a reduction in size and cost is easier and the halfway fitting detection accuracy is higher than conventional.

In order to solve the above-mentioned problems, according to a first aspect of this invention, there is provided an electrical connector comprising a rotatable locking lever serving to lock a fitting state with a mating connector and a switch having a drive portion, wherein the locking lever comprises a rotation shaft as a center of rotation, an engaging portion adapted to engage with the mating connector, and an operating portion provided between the engaging portion and the rotation shaft and capable of operating the drive portion, and wherein when fitting to the mating connector, the locking lever is rotated so that the operating portion operates the drive portion.

According to a second aspect of this invention, there is provided an electrical connector unit comprising the electrical connector according to the first aspect of this invention and the mating connector adapted to be fitted to the electrical connector.

According to a third aspect of this invention, there is provided an electric vehicle charger having the electrical connector according to the first aspect of this invention.

EFFECT OF THE INVENTION

According to this invention, it is possible to provide an electrical connector with which a reduction in size and cost is easier and the halfway fitting detection accuracy is higher than conventional.

MODE FOR CARRYING OUT THE INVENTION

Hereinbelow, preferred embodiments of this invention will be described in detail with reference to the drawings.

First, referring to FIGS. 1 to 5, the outline of an electrical connector unit 100 according to the first embodiment will be described.

Herein, as the connector unit 100, there is illustrated an electrical connector unit for an electric vehicle rapid charger.

Figure 1:
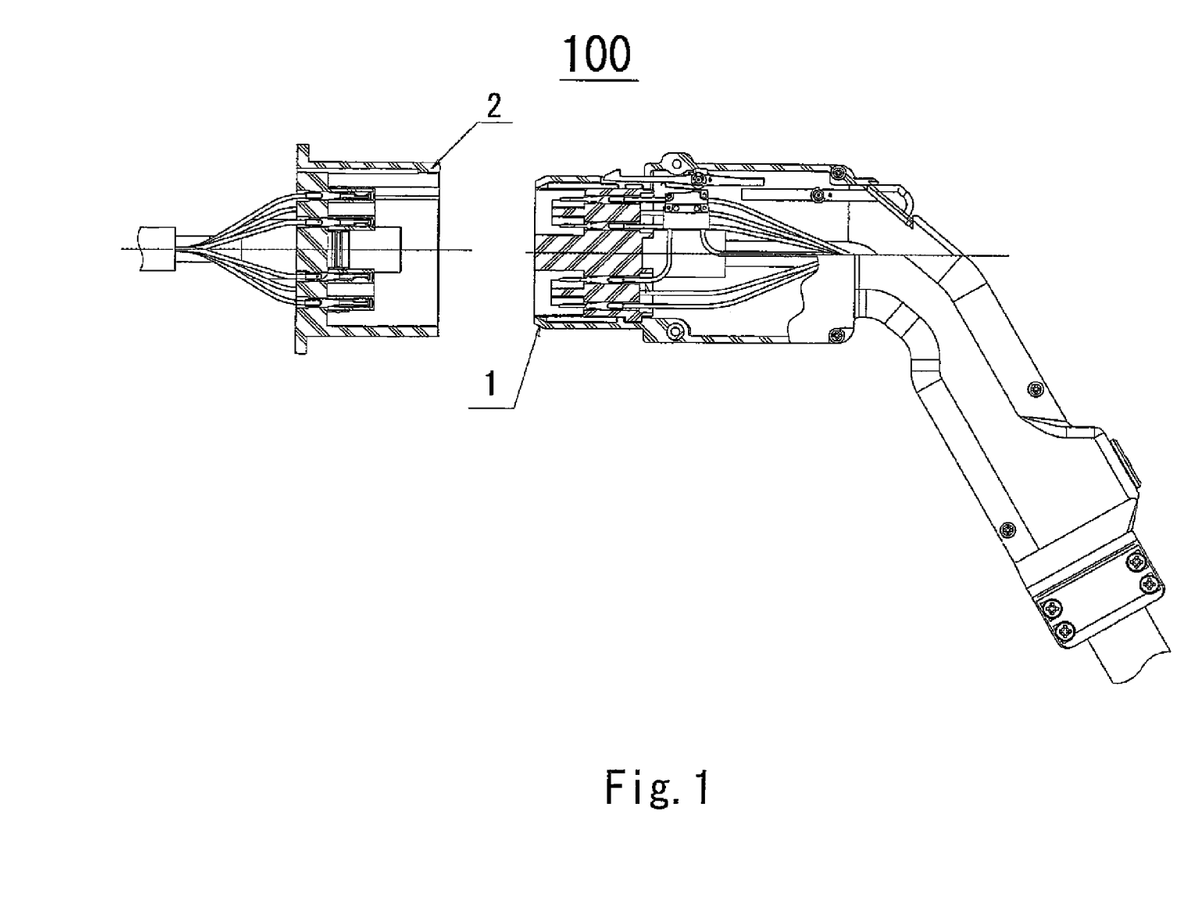
FIG. 1 is a cross-sectional view showing an electrical connector unit according to a first embodiment of this invention.

As shown in FIG. 1, the connector unit 100 comprises a power feeding side connector (plug connector) 1 as an electrical connector and a power receiving side connector (receptacle connector) 2.

Herein, the power feeding side connector 1 is a connector provided on the rapid charger side while the power receiving side connector 2 is a connector provided on the electric vehicle side.

Figure 2:
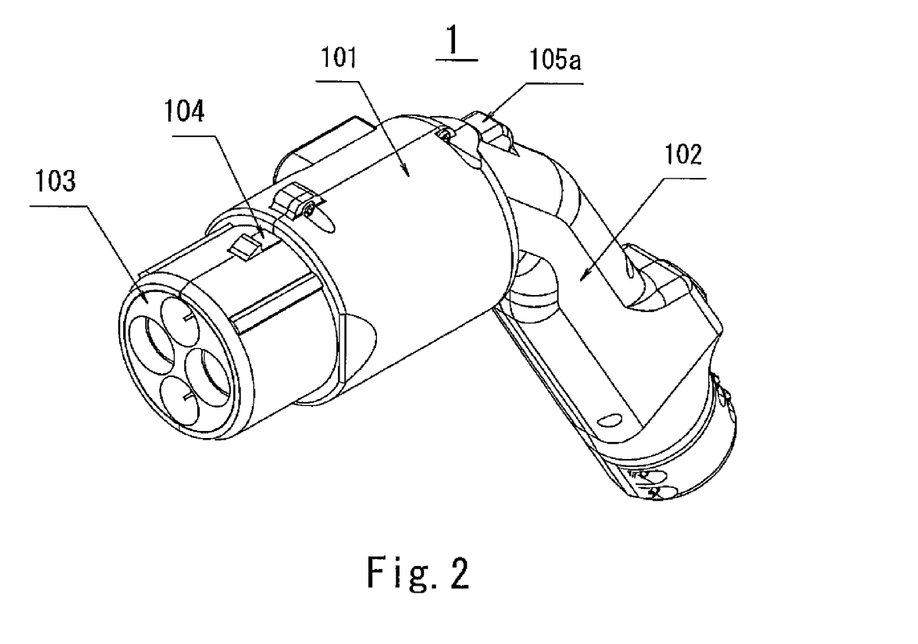
FIG. 2 is a perspective view showing a power feeding side connector according to the first embodiment.
Figure 4:
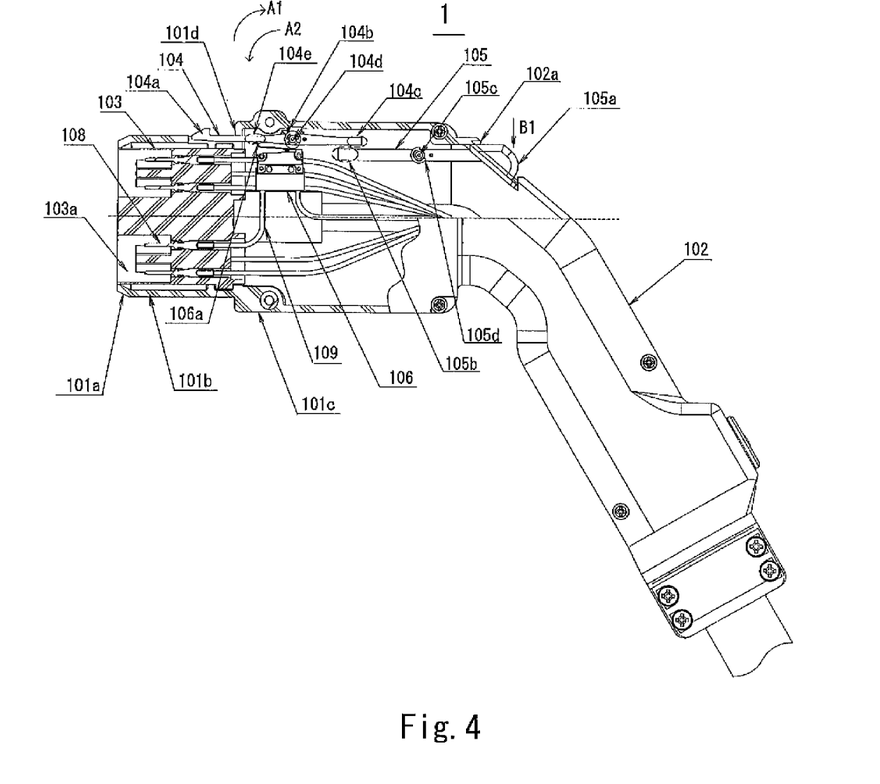
FIG. 4 is a side view, partially sectioned, showing the power feeding side connector according to the first embodiment.

As shown in FIGS. 2 and 4, the power feeding side connector 1 comprises an outer shell 101 serving as an outer cover, a grip 102 provided at one end of the outer shell 101 and adapted to be used by a user to hold the power feeding side connector 1 during charging, an inner housing 103 provided in the outer shell 101 and exposed to the outside at its end, signal contacts 108 which are fixedly disposed in the inner housing 103 and exposed at their ends and which are adapted to be electrically connected to the power receiving side connector 2, signal lines 109 provided in the outer shell 101 and connected to the signal contacts 108, respectively, a locking lever 104 provided in the outer shell 101 and adapted to lock the power feeding side connector 1 and the power receiving side connector 2 together during fitting (during charging), a microswitch 106 connected to the signal lines 109 and adapted to detect halfway fitting of the locking lever 104 to interrupt conduction of the signal lines 109, and a release lever 105 serving as a release portion for releasing locking by the locking lever 104 after charging.

Figure 3:
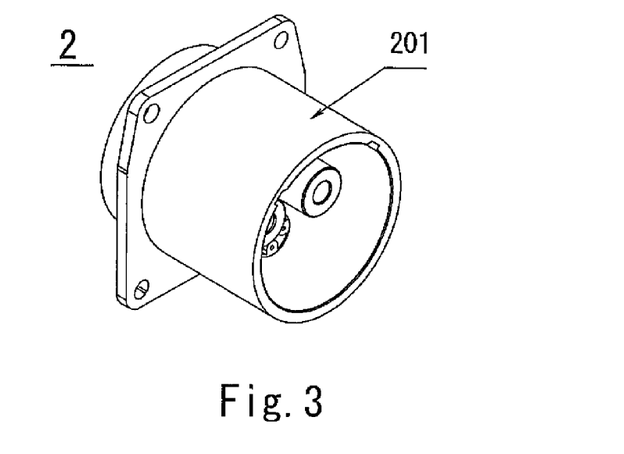
FIG. 3 is a perspective view showing a power receiving side connector according to the first embodiment.
Figure 5:
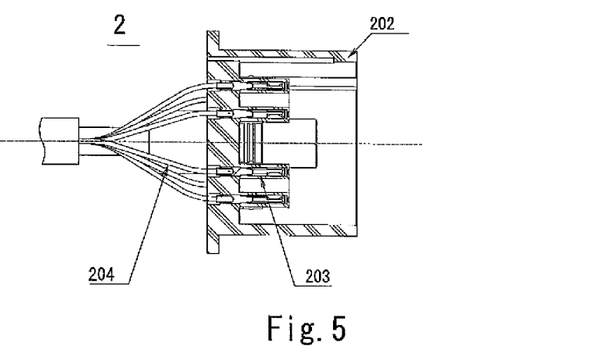
FIG. 5 is a side view, partially sectioned, showing the power receiving side connector according to the first embodiment.

On the other hand, as shown in FIGS. 3 and 5, the power receiving side connector 2 comprises a tubular housing 201 into which the power feeding side connector 1 is inserted, a recessed locking portion 202 provided on an inner wall of the housing 201 and adapted to engage with the locking lever 104 during locking, signal contacts 203 which are fixedly disposed in the housing 201 so as to be exposed at their ends and which are adapted to be electrically connected to the signal contacts 108 of the power feeding side connector 1, respectively, and signal lines 204 connected to the signal contacts 203, respectively.

Next, the structures and positional relationship of the respective components of the power feeding side connector 1 will be described in more detail with reference to FIGS. 2 and 4.

The outer shell 101 is the outer cover of the power feeding side connector 1 and has a tubular large-diameter portion 101c and a tubular small-diameter portion 101b which is provided at one end of the large-diameter portion 101c, opposite to its end where the grip 102 is provided, and which has a diameter smaller than that of the large-diameter portion 101 and is coaxial with the large-diameter portion 101c.

A front end 101a of the small-diameter portion 101b is chamfered.

The inner housing 103 is an insulating member having a cylindrical shape corresponding to an inner peripheral shape of the small-diameter portion 101b and is provided in the small-diameter portion 101b.

The end of the inner housing 103 is exposed to the outside and is provided with recesses 103a. The signal contacts 108 are fixed in the recesses 103a.

The locking lever 104 is a rod-like member provided in the large-diameter portion 101c so as to face the direction of fitting to the power receiving side connector 2 (the direction along the central axis direction or the axial direction of the outer shell 101). The locking lever 104 is rotatable about a rotation shaft 104d in directions A1 and A2 in FIG. 4, i.e. in outward and inward directions of the outer shell 101.

The rotation shaft 104d is fixed to an inner wall of the large-diameter portion 101c of the outer shell 101 and faces a direction crossing (herein, a direction perpendicular to) the axial direction of the outer shell 101.

A coil spring 104b is provided on the rotation shaft 104d so as to apply a rotational force to the locking lever 104 in the direction (direction A1 in FIG. 4) in which the locking lever 104 is rotated outward of the power feeding side connector 1.

The locking lever 104 has a locking claw 104a provided at its end on the inner housing 103 side (the small-diameter portion 101b side).

In FIG. 4, the locking claw 104a is provided so as to protrude upward of the locking lever 104, i.e. protrude outward from the circumference of the outer shell 101 of the power feeding side connector 1, and has a claw-like shape which is engageable with the locking portion 202 of the power receiving side connector 2.

The locking lever 104 is provided in the large-diameter portion 101c of the outer shell 101 while at least the locking claw 104a is exposed to the outside.

More specifically, the locking claw 104a is exposed to the outside so as to protrude to the small-diameter portion 101b side from an opening 101d provided at a coupling portion between the large-diameter portion 101c and the small-diameter portion 101b.

A portion, on the opposite side of the locking claw 104a with respect to the rotation shaft 104d, of the locking lever 104 forms an acting portion 104c adapted to be brought into contact with the release lever 105. The acting portion 104c is provided in the large-diameter portion 101c.

The microswitch 106 is a switch having non-illustrated normally-closed contacts and is connected to relay the signal lines 109.

The microswitch 106 has a spring piece 106a as a drive portion. When the spring piece 106a is pushed, the non-illustrated normally-closed contacts are opened to interrupt conduction of the signal lines 109.

That is, the microswitch 106 is a so-called push-type microswitch.

In FIG. 4, the microswitch 106 is provided under the locking lever 104, i.e. inward of the locking lever 104, in the large-diameter portion 101c of the outer shell 101.

Further, the spring piece 106a of the microswitch 106 is disposed at a position so that it can be brought into contact with an intermediate portion 104e of the locking lever 104 between the locking claw 104a and the rotation shaft 104d. That is, the intermediate portion 104e is disposed at a position so that it can push the spring piece 106a.

The release lever 105 is a rod-like member which is provided on an extension line of the locking lever 104 on the grip 102 side so that a projection plane of the release lever 105 partly overlaps that of the locking lever 104. The release lever 105 is rotatable about a rotation shaft 105c in the same directions of the locking lever 104, i.e. in the directions A1 and A2 in FIG. 4.

That is, in FIG. 4, like the locking lever 104, the release lever 105 is disposed along the axial direction of the outer shell 101, and the rotation shaft 105c rotatably holding the release lever 105 is fixed to the inner wall of the large-diameter portion 101c of the outer shell 101 so as to cross (herein, perpendicularly cross) the axial direction of the outer shell 101.

The release lever 105 is provided in the large-diameter portion 101c of the outer shell 101 and an end portion, on the side near the locking lever 104, of the release lever 105 forms a locking lever side end portion 105b overlapping the acting portion 104c of the locking lever 104.

The locking lever side end portion 105b can be brought into contact with a lower surface of the acting portion 104c.

Further, an end portion, on the side remote from the locking lever 104, of the release lever 105 is exposed to the outside of the large-diameter portion 101c and forms a button-like release lever pressing portion 105a that can be pressed in a direction B1 in FIG. 4, i.e. into the outer shell 101.

Specifically, the release lever pressing portion 105a reaches the grip 102 beyond the large-diameter portion 101c and is exposed to the outside from an opening 102a formed in the grip 102.

A coil spring 105d is provided on the rotation shaft 105c so as to apply a rotational force to the release lever 105 in the direction (direction A2 in FIG. 4) in which the locking lever side end portion 105b moves away from the acting portion 104c.

Next, the operations of the locking lever 104, the microswitch 106, and the release lever 105 at the time of fitting of the connector unit 100 will be described with reference to FIGS. 4 to 8.

First, in the state before the start of fitting, i.e. in the state where the power feeding side connector 1 and the power receiving side connector 2 are not in contact with each other, the locking lever 104, the microswitch 106, and the release lever 105 are in the state shown in FIG. 4.

Specifically, the intermediate portion 104e of the locking lever 104 is not pushing the spring piece 106a of the microswitch 106 and, further, the locking lever side end portion 105b of the release lever 105 is not pushing the acting portion 104c of the locking lever 104.

The locking lever 104 and the release lever 105 are respectively held in the above-mentioned states by the coil spring 104b and the coil spring 105d.

More specifically, the locking lever 104 is imparted with the rotational force in the direction A1 by the coil spring 104b, but, in the state of FIG. 4, the locking lever 104 abuts against the rim of the opening 101d so that the locking lever 104 is supported at two portions, i.e. the rotation shaft 104d and the rim of the opening 101d, and thus is held in this state.

On the other hand, the release lever 105 is imparted with the rotational force in the direction A2 by the coil spring 105d, but, in the state of FIG. 4, the release lever 105 abuts against the rim of the opening 102a so that the release lever 105 is supported at two portions, i.e. the rotation shaft 105c and the rim of the opening 102a, and thus is held in this state.

Then, from the state shown in FIG. 4, the small-diameter portion 101b of the outer shell 101 of the power feeding side connector 1 is inserted into the housing 201 of the power receiving side connector 2.

Specifically, the user grips the grip 102 of the power feeding side connector 1 and, using the front end 101a as a guide, inserts the small-diameter portion 101b of the outer shell 101 into the housing 201 of the power receiving side connector 2.

Figure 6:
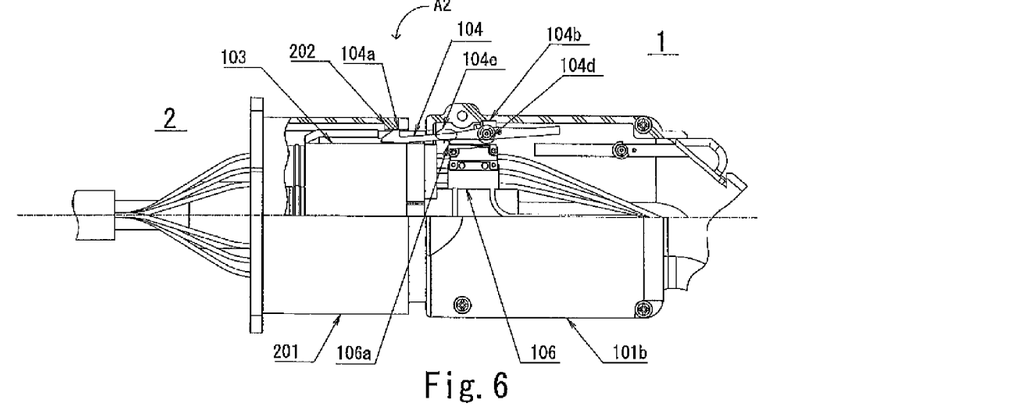
FIGS. 6 to 8 are diagrams showing a procedure for fitting the power feeding side connector and the power receiving side connector to each other.

Then, as shown in FIG. 6, the locking claw 104a of the locking lever 104 is brought into contact with the inner wall of the housing 201 so as to be pressed downward (inward) and, therefore, the locking lever 104 is rotated in the direction A2 about the rotation shaft 104d against the elastic force of the coil spring 104b.

This state is a halfway fitting state.

In this state, most of the inner housing 103 (small-diameter portion 101b) of the power feeding side connector 1 is received in the housing 201 of the power receiving side connector 2, but the signal contacts 108 of the power feeding side connector 1 are only in contact with the signal contacts 203 of the power receiving side connector 2 and the power feeding side connector 1 and the power receiving side connector 2 are not locked together, i.e. are not completely fitted together.

As a consequence, if charging is started in this state, there is a possibility that a leak occurs to cause an extremely dangerous state such as an electric shock to the user.

However, in this state, the intermediate portion 104e of the pressed-down locking lever 104 pushes the spring piece 106a of the microswitch 106 so that the non-illustrated normally-closed contacts of the microswitch 106 are opened.

The microswitch 106 with the non-illustrated normally-closed contacts being opened interrupts conduction of the signal lines 109.

As a consequence, the signal lines 109 do not conduct in the halfway fitting state and thus charging is not started.

Figure 7:
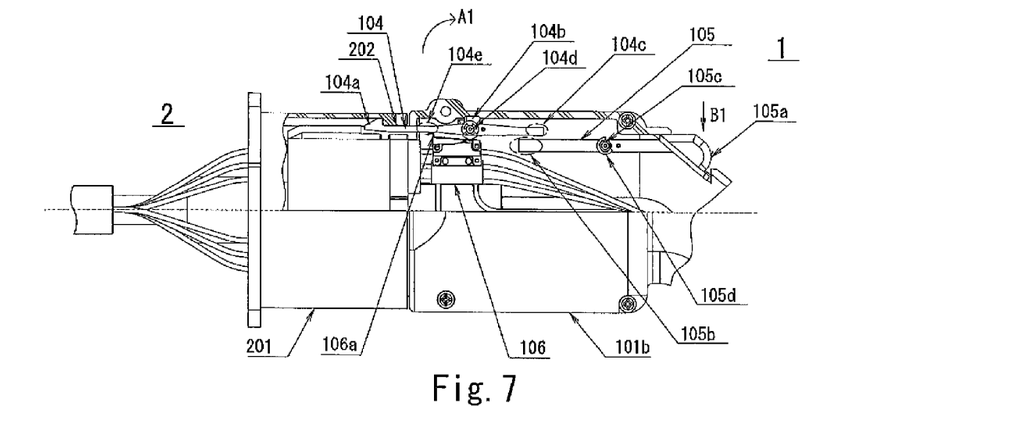

Then, when the power feeding side connector 1 is further inserted from the state of FIG. 6 so that the locking claw 104a slides on the inner wall of the housing 201 to reach the locking portion 202, the locking lever 104 is rotated in the direction A1 by the elastic force of the coil spring 104b so that the locking claw 104a engages with the locking portion 202 as shown in FIG. 7.

In this state, the pushing of the spring piece 106a by the intermediate portion 104e is released and, therefore, the non-illustrated normally-closed contacts of the microswitch 106 are closed again to enable conduction of the signal lines 109.

That is, since the signal lines 109 conduct, current flows from the power feeding side connector 1 to the power receiving side connector 2 so that charging is carried out.

In this state, since the locking claw 104a engages with the locking portion 202 as described above, the power feeding side connector 1 and the power receiving side connector 2 are locked together and thus there is no possibility of the connectors 1 and 2 being accidentally detached.

After the charging is finished, the user then presses the release lever pressing portion 105a of the release lever 105 in the direction B1 in FIG. 7.

Figure 8:
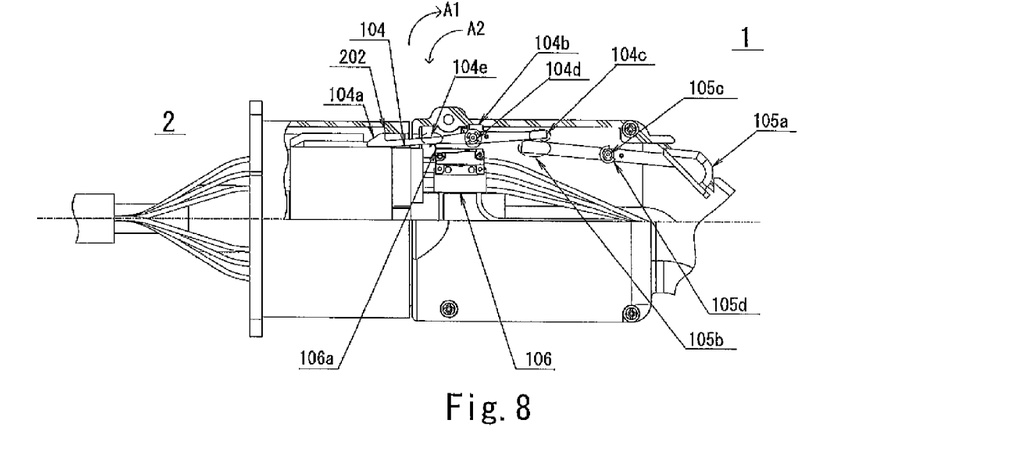

Then, as shown in FIG. 8, the release lever 105 is rotated in the direction A1 about the rotation shaft 105c against the elastic force of the coil spring 105d so that the locking lever side end portion 105b is brought into contact with the acting portion 104c to push it upward (outward).

When the acting portion 104c is pushed upward (outward), the locking lever 104 is rotated in the direction A2 about the rotation shaft 104d against the elastic force of the coil spring 104b so that the intermediate portion 104e and the locking claw 104a are moved downward (inward).

The moved-down intermediate portion 104e pushes the spring piece 106a of the microswitch 106 so that the non-illustrated normally-closed contacts of the microswitch 106 are opened.

The microswitch 106 with the non-illustrated normally-closed contacts being opened interrupts conduction of the signal lines 109.

Further, the moved-down locking claw 104a disengages from the locking portion 202 so that the engagement therebetween is released.

In this state, the power feeding side connector 1 and the power receiving side connector 2 do not conduct and are not locked together and, therefore, the power feeding side connector 1 can be pulled out of the power receiving side connector 2 with no possibility of a leak.

When the user pulls the power feeding side connector 1 out of the power receiving side connector 2 and releases the pressing of the release lever 105, the locking lever 104 and the release lever 105 are respectively rotated in the directions A1 and A2 by the elastic forces of the coil spring 104b and the coil spring 105d so as to return to the state before fitting shown in FIG. 4.

The foregoing are the operations of the locking lever 104, the microswitch 106, and the release lever 105 at the time of fitting of the connector unit 100.

As described above, according to the first embodiment, the power feeding side connector 1 has the locking lever 104 serving to lock the fitting state with the power receiving side connector 2 and the microswitch 106 serving to detect the halfway fitting of the locking lever 104 to interrupt electrical conduction. In the halfway fitting state, the operating portion (intermediate portion 104e) of the locking lever 104 between the rotation shaft 104d and the locking claw 104a pushes the spring piece 106a to cause the microswitch 106 to interrupt conduction of the power feeding side connector 1.

Accordingly, since the members associated with the halfway fitting detection are collectively provided between the rotation shaft 104d and the locking claw 104a of the locking lever 104, the structure is compact.

Further, according to the first embodiment, since it is sufficient for the operating portion (intermediate portion 104e) to be provided between the rotation shaft 104d and the locking claw 104a, the restriction in designing the operating portion is small so that a reduction in size and cost of the connector is easy.

Further, according to the first embodiment, unless there is abnormality in the size or shape of the locking lever 104 between the rotation shaft 104d and the locking claw 104a, the halfway fitting can be detected regardless of the size and shape of the release lever 105. As a consequence, the halfway fitting can be detected more reliably than conventional.

Next, the second embodiment will be described with reference to FIG. 9.

The second embodiment is configured such that, in the first embodiment, a release button 107 as a release portion is provided at a position facing the intermediate portion 104e of the locking lever 104 in such a manner as to be exposed to the outside.

In the second embodiment, the same reference symbols as those in the first embodiment are assigned to components having the same functions as those in the first embodiment, thereby omitting explanation thereof.

Figure 9:
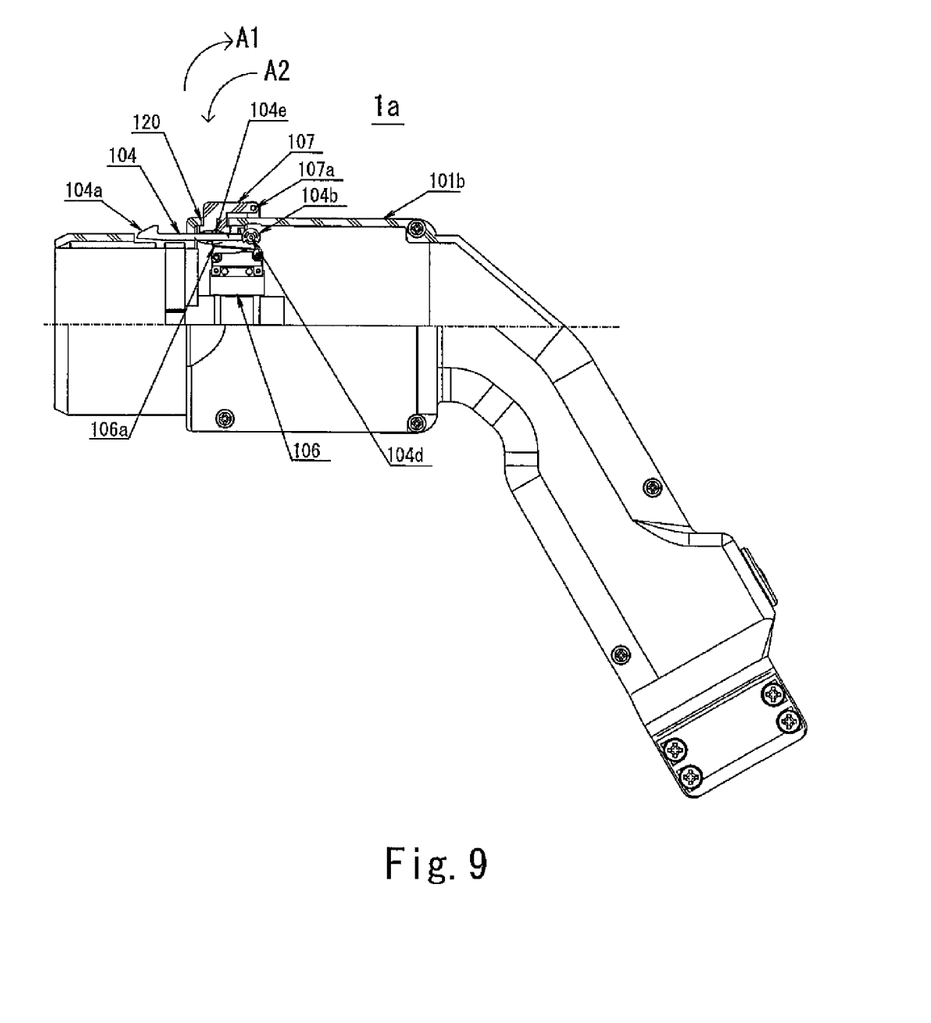
FIG. 9 is a side view, partially sectioned, showing a power feeding side connector according to a second embodiment of this invention, wherein illustration of signal lines is omitted.

As shown in FIG. 9, in a power feeding side connector 1a according to the second embodiment, a surface, facing an intermediate portion 104e of a locking lever 104, of an outer shell 101 (large-diameter portion 101c) is opened to form a release opening 120 and a release button 107 is provided as an operating portion in the release opening 120.

The release button 107 has an L-shape in side cross-section and has one end facing an upper surface (outside surface) of the intermediate portion 104e of the locking lever 104 and the other end held by a rotation shaft 107a outside the outer shell 101 so as to be rotatable in directions A1 and A2 in FIG. 9.

A non-illustrated coil spring is provided to urge the release button 107 in the direction A1 so that, in the state of FIG. 9 (before fitting or during fitting), a rotational force is applied to the release button 107 in the direction A1 to prevent the release button 107 from pressing the locking lever 104.

While the release button 107 is exposed to the outside of the outer shell 101, the end, facing the intermediate portion 104e, of the release button 107 has a larger width than that of the release opening 120 so that the release button 107 is prevented from coming off from the release opening 120 even if the release button 107 is rotated in the direction A1.

The structure of a power receiving side connector 2a (not illustrated) is the same as that of the power receiving side connector 2 in the first embodiment and, therefore, explanation thereof is omitted.

Next, the operations of the locking lever 104, a microswitch 106, and the release button 107 at the time of fitting of a connector unit 100a will be described with reference to FIG. 9.

First, in the state before fitting, i.e. in the state shown in FIG. 9, the locking lever 104 is imparted with a rotational force in the direction A1 by an elastic force of a coil spring 104b and abuts against the rim of an opening 101d so that the intermediate portion 104e of the locking lever 104 is not pushing a spring piece 106a of the microswitch 106.

On the other hand, the release button 107 is imparted with the rotational force in the direction A1 by the elastic force of the non-illustrated coil spring and abuts against the rim of the release opening 120 so that the release button 107 is not pushing the intermediate portion 104e of the locking lever 104.

Then, from the state shown in FIG. 9, a user inserts a small-diameter portion 101b of the power feeding side connector 1a into a housing 201 of the power receiving side connector 2a.

Then, a locking claw 104a of the locking lever 104 is brought into contact with an inner wall of the housing 201 so as to be pressed downward (inward) and, therefore, the locking lever 104 is rotated in the direction A2 about a rotation shaft 104d against the elastic force of the coil spring 104b (see FIG. 6).

This state is a halfway fitting state.

In this state, the intermediate portion 104e of the presseddown locking lever 104 is brought into contact with the spring piece 106a of the microswitch 106 and pushes it so that normally-closed contacts of the microswitch 106 are opened.

The microswitch 106 with the normally-closed contacts being opened interrupts conduction of signal lines 109.

Then, when the power feeding side connector 1a is further inserted so that the locking claw 104a slides on the inner wall of the housing 201 to reach a locking portion 202, the locking lever 104 is rotated in the direction A1 by the elastic force of the coil spring 104b so that the locking claw 104a engages with the locking portion 202 (see FIG. 7).

In this state, the intermediate portion 104e of the locking lever 104 is separated from the spring piece 106a of the microswitch 106 and, therefore, the normally-closed contacts of the microswitch 106 are closed again to enable conduction of the signal lines 109.

That is, since the signal lines 109 conduct, current flows from the power feeding side connector 1a to the power receiving side connector 2a so that charging is carried out.

So far, the operations are the same as those in the first embodiment.

After the charging is finished, the user then presses the release button 107 in the direction A2.

Then, the release button 107 is rotated in the direction A2 about the rotation shaft 107a against the elastic force of the non-illustrated coil spring and thus is brought into contact with the intermediate portion 104e to push it downward (inward).

When the intermediate portion 104e is pushed downward (inward), the locking lever 104 is rotated in the direction A2 about the rotation shaft 104d against the elastic force of the coil spring 104b so that the intermediate portion 104e and the locking claw 104a are moved downward (inward).

The moved-down intermediate portion 104e pushes the spring piece 106a of the microswitch 106 so that the normally-closed contacts of the microswitch 106 are opened.

The microswitch 106 with the normally-closed contacts being opened interrupts conduction of the signal lines 109.

Further, the moved-down locking claw 104a disengages from the locking portion 202 so that the engagement therebetween is released.

In this state, the power feeding side connector 1a and the power receiving side connector 2a do not conduct and are not locked together and, therefore, the power feeding side connector 1a can be pulled out of the power receiving side connector 2a with no possibility of a leak.

The foregoing are the operations of the locking lever 104, the microswitch 106, and the release button 107 at the time of fitting of the connector unit 100a.

As described above, according to the second embodiment, the power feeding side connector 1a has the locking lever 104 serving to lock the fitting state with the power receiving side connector 2a and the microswitch 106 serving to detect the halfway fitting of the locking lever 104 to interrupt electrical conduction. In the halfway fitting state, the intermediate portion 104e of the locking lever 104 pushes the spring piece 106a to cause the microswitch 106 to interrupt conduction of the power feeding side connector 1a.

Accordingly, the second embodiment exhibits the same effect as the first embodiment.

Further, according to the second embodiment, the power feeding side connector 1a is configured such that the release button 107 is disposed so as to be exposed to the outside while facing the intermediate portion 104e of the locking lever 104 and thus that the locking is released by directly pushing the intermediate portion 104e using the release button 107.

As a consequence, as compared with the first embodiment, the release lever 105 is not required and, further, not only the members associated with the halfway fitting detection but also the members associated with the release of the engagement are collectively provided between the rotation shaft 104d and the locking claw 104a of the locking lever 104, and therefore, the structure is more compact and thus a reduction in size and cost of the connector is easier.

Next, the third embodiment will be described with reference to FIGS. 10 and 11.

The third embodiment is configured such that, in the first embodiment, the acting portion 104c is provided with a fitting detecting portion 110.

In the third embodiment, the same reference symbols as those in the first embodiment are assigned to components having the same functions as those in the first embodiment, thereby omitting explanation thereof.

Figure 10:
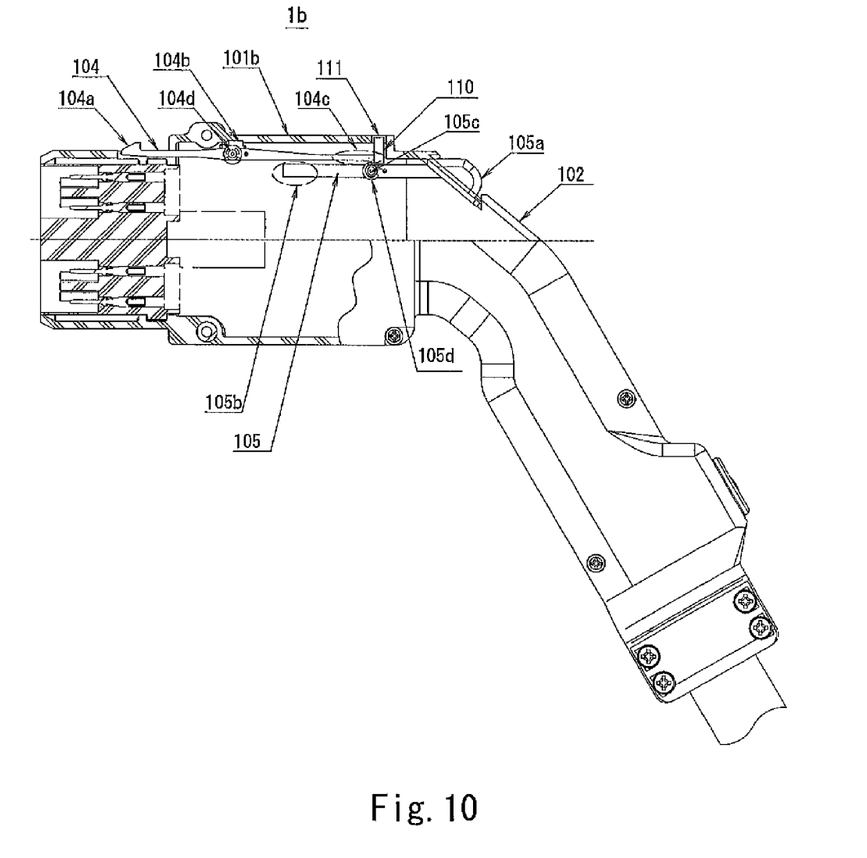
FIG. 10 is a side view, partially sectioned, showing a power feeding side connector according to a third embodiment of this invention, wherein illustration of a microswitch and signal lines is omitted.

As shown in FIG. 10, in a power feeding side connector 1b according to the third embodiment, an acting portion 104c of a locking lever 104 is provided with a fitting detecting portion 110 extending toward the outside of a large-diameter portion 101c of an outer shell 101. The fitting detecting portion 110 is for a user to visually confirm halfway fitting of the locking lever 104.

If necessary, an end portion of the fitting detecting portion 110 may be colored with a color that enhances the visuality or may be bonded with a colored member that enhances the visuality.

A surface, facing the fitting detecting portion 110, of the outer shell 101 (large-diameter portion 101c) has an opening with a shape corresponding to that of the fitting detecting portion 110, thereby forming a fitting detection window 111.

Since the acting portion 104c can be freely used in design of the power feeding side connector 1b, it is possible to provide the fitting detecting portion 110 as described above.

Next, the operation of the fitting detecting portion 110 at the time of fitting of a connector unit 100b according to the third embodiment will be described with reference to FIGS. 10 and 11.

Since the operations of the other members are the same as those in the first embodiment, explanation thereof is omitted.

First, in the state shown in FIG. 10, i.e. in the state before fitting the power feeding side connector 1b to a power receiving side connector 2b (not illustrated), the fitting detecting portion 110 is fully received in the outer shell 101 (large-diameter portion 101c) and thus is not exposed from the outer shell 101.

Figure 11:
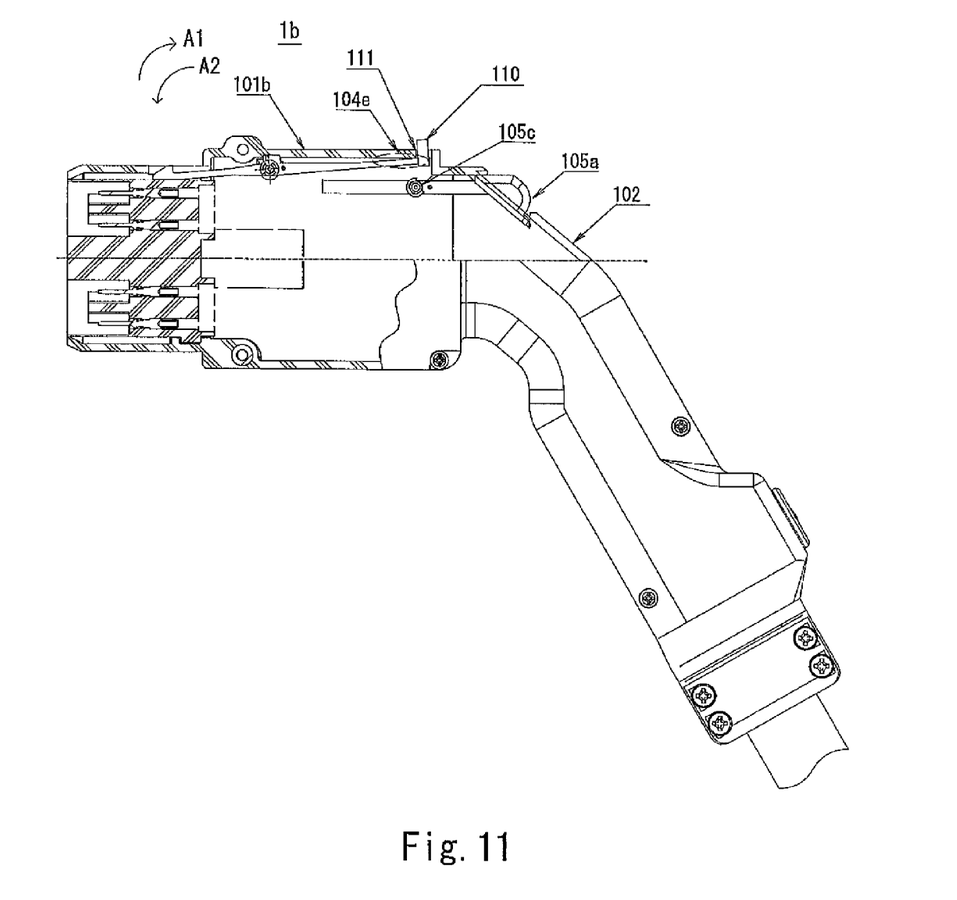
FIG. 11 is a side view, partially sectioned, showing the power feeding side connector in a halfway fitting state, wherein the illustration of the microswitch and the signal lines is omitted.

Then, in the state shown in FIG. 11, i.e. in the state where a locking claw 104a of the locking lever 104 is brought into contact with an inner wall of a housing 201 so as to be pressed downward (inward), i.e. rotated in a direction A2, the acting portion 104c is moved inversely upward (outward) and, therefore, the fitting detecting portion 110 is also moved upward (outward) so as to be exposed to the outside of the outer shell 101 (large-diameter portion 101c) from the fitting detection window 111.

In this state, the user can visually observe the exposed fitting detecting portion 110 and thus can visually confirm that the power feeding side connector 1b is in the halfway fitting state, i.e. charging should not be started.

As a consequence, it is possible to further enhance the safety (e.g. prevention of electric shock) in use of the power feeding side connector 1b.

Then, when the power feeding side connector 1b is further inserted from the state of FIG. 11 so that the locking claw 104a slides on the inner wall of the housing 201 to reach a locking portion 202, the locking lever 104 is rotated in a direction A1 by an elastic force of a coil spring 104b so that the locking claw 104a engages with the locking portion 202 (see FIG. 7).

In this state, since the acting portion 104c is moved downward (inward) from the state of FIG. 11, the fitting detecting portion 110 is also moved downward (inward) and thus, as shown in FIG. 10, is fully received again in the outer shell 101 (large-diameter portion 101c).

In this state, the user cannot visually observe the fitting detecting portion 110 and thus can visually confirm that the power feeding side connector 1b is not in the halfway fitting state, i.e. charging can be started.

As described above, according to the third embodiment, the power feeding side connector 1b has the locking lever 104 serving to lock the fitting state with the power receiving side connector 2b and a microswitch 106 (illustration of the microswitch 106 is omitted in FIGS. 10 and 11) serving to detect the halfway fitting of the locking lever 104 to interrupt electrical conduction. In the halfway fitting state, an intermediate portion 104e of the locking lever 104 between a rotation shaft 104d and the locking claw 104a pushes a spring piece 106a to cause the microswitch 106 to interrupt conduction of the power feeding side connector 1b.

Accordingly, the third embodiment exhibits the same effect as the first embodiment.

Further, according to the third embodiment, the power feeding side connector 1b has, at the acting portion 104c, the fitting detecting portion 110 which extends to the outer shell 101 side and is used for visually confirming the halfway fitting. In the halfway fitting state, the fitting detecting portion 110 is exposed to the outside.

As a consequence, it is possible to electrically and visually detect the halfway fitting and thus to more enhance the safety in use as compared with the first embodiment.

While this invention has been described with reference to the embodiments, the invention is not limited thereto.

A person skilled in the art can naturally think of various modifications and improvements in the technical scope of this invention and it is understood that those modifications and improvements are also included in the scope of this invention.

For example, the structure using the spring piece 106a is shown as the microswitch 106 in the above-mentioned embodiments, but the microswitch 106 is not necessarily limited to the structure using the spring piece 106a as long as it is a microswitch which is configured such that normally-closed contacts are opened by pushing.

Further, in the above-mentioned embodiments, the microswitch 106 is configured such that the normally-closed contacts are opened by pushing down the spring piece 106a, but it may alternatively be a microswitch which is configured such that normally-closed contacts are opened by pulling up a spring piece 106a using an intermediate portion 104e of a locking lever 104.

What is claimed is:

1. An electrical connector comprising a rotatable locking lever serving to lock a fitting state with a mating connector and a switch having a drive portion,
   wherein the locking lever comprises:
   a rotation shaft as a center of rotation;
   an engaging portion adapted to engage with the mating connector; and
   an operating portion provided between the engaging portion and the rotation shaft and contacting with the drive portion and operating the drive portion, and
   wherein when fitting to the mating connector, the locking lever is rotated so that the operating portion operates the drive portion.

2. The electrical connector according to claim 1, wherein the operating portion is an intermediate portion forming part of the locking lever between the engaging portion and the rotation shaft,
   the drive portion is provided so as to face the intermediate portion, and
   conduction of the switch is interrupted when the intermediate portion operates the drive portion.

3. The electrical connector according to claim 2, further comprising a release portion adapted to release locking by the locking lever.

4. The electrical connector according to claim 3, wherein the release portion comprises:
   an acting portion of the locking lever, the acting portion provided on an opposite side of the engaging portion with respect to the rotation shaft;
   a rotatable release lever being brought into contact with the acting portion to rotatably operate the locking lever; and
   a release lever pressing portion provided so as to be pressing the release lever, the release lever pressing portion adapted to rotate the release lever by pressing to bring the release lever into contact with the acting portion, thereby rotating the locking lever.

5. The electrical connector according to claim 4, wherein the acting portion has a fitting detecting portion capable of being exposed to the outside and the fitting detecting portion is exposed to the outside in a state where the operating portion operates the drive portion.

6. The electrical connector according to claim 3, wherein the release portion comprises a release button which is provided so as to be exposed to the outside while facing the intermediate portion and being brought into contact with the intermediate portion, and
   wherein when the release button pushes the intermediate portion, the locking lever is rotated to release the locking and the pushed intermediate portion operates the drive portion.

7. The electrical connector according to claim 1, further comprising:
   a tubular outer shell in which a signal line is disposed;
   an inner housing provided at one end of the outer shell; and
   a signal contact disposed in the inner housing and electrically connected to the signal line, the signal contact adapted to be electrically connected to the mating connector,
   wherein the switch is connected to relay the signal line.

8. The electrical connector according to claim 7, wherein the rotation shaft is fixed to an inner wall of the outer shell in a direction crossing an axial direction of the outer shell,
   the locking lever is supported by the rotation shaft along the axial direction of the outer shell,
   the engaging portion is a claw-like member exposed so as to protrude outward from an outer surface of the outer shell, and
   the switch is disposed so that at least the drive portion faces the operating portion and is positioned inward of the operating portion in the outer shell.

9. An electrical connector unit comprising the electrical connector according to claim 1 and the mating connector adapted to be fitted to the electrical connector.

10. An electric vehicle charger having the electrical connector according to claim 1.

* * * * *